(12) United States Patent  
Blot et al.

(10) Patent No.: US 9,033,249 B2  
(45) Date of Patent: May 19, 2015

(54) PAYMENT CARD COMPRISING AN ELECTRONIC GAME CHIP

(75) Inventors: Philippe Blot, Neauphle le Chateau (FR); Didier Mobetie, Versailles (FR); Jean-Charles Renaud, Fontenay les Briis (FR); Eric Bouhanna, Garches (FR)

(73) Assignee: UINT, Saint-Aubin (FR)

( * ) Notice: Subject to any disclaimer, the term of this patent is extended or adjusted under 35 U.S.C. 154(b) by 87 days.

(21) Appl. No.: 13/697,154

(22) PCT Filed: Apr. 27, 2011

(86) PCT No.: PCT/FR2011/050952  
§ 371 (c)(1),  
(2), (4) Date: Nov. 9, 2012

(87) PCT Pub. No.: WO2011/141659  
PCT Pub. Date: Nov. 17, 2011

(65) Prior Publication Data  
US 2013/0056540 A1 Mar. 7, 2013

(30) Foreign Application Priority Data

May 10, 2010 (FR) .................................. 10 53636

(51) Int. Cl.  
*G06K 19/06* (2006.01)  
*G06K 19/07* (2006.01)  
*G06Q 20/34* (2012.01)  
*G07F 7/08* (2006.01)  
G07F 7/10 (2006.01)  
*G07F 17/32* (2006.01)

(52) U.S. Cl.  
CPC ........ *G06K 19/0723* (2013.01); *G06K 19/0719* (2013.01); *G06K 19/072* (2013.01); *G06Q 20/341* (2013.01); *G06Q 20/354* (2013.01); *G06Q 20/3576* (2013.01); *G07F 7/0826* (2013.01); *G07F 7/0846* (2013.01); *G07F 7/0853* (2013.01); *G07F 7/086* (2013.01); *G07F 7/1025* (2013.01); *G07F 17/32* (2013.01)

(58) Field of Classification Search  
USPC ......................................... 235/492, 487, 379  
IPC ............... G06K 19/07749; G07F 7/1008,19/20, G07F 19/201; G06Q 20/341, 20/1085; B42D 15/10  
See application file for complete search history.

(56) References Cited

U.S. PATENT DOCUMENTS

| 4,764,666 | A | 8/1988 | Bergeron | |
|---|---|---|---|---|
| 7,163,153 | B2 * | 1/2007 | Blossom | ....................... 235/492 |
| 2008/0096624 | A1 | 4/2008 | Rydberg | |

FOREIGN PATENT DOCUMENTS

WO 02/37928 5/2002

*Primary Examiner* — Karl D Frech  
(74) *Attorney, Agent, or Firm* — Greer, Burns & Crain, Ltd.

(57) ABSTRACT

A payment card is provided including a support in the format of a conventional bank payment card, and having a first integrated circuit dedicated to banking operations, a second integrated circuit not dedicated to banking operations; at least one man/machine interface, the second integrated circuit being configured so as to activate at least one part of the man/machine interface in response to a directive from the user and according to an algorithm contained in the second integrated circuit. A memory space is connected to the second integrated circuit for saving data arising from the execution of the algorithm; the memory space being also connected to the first integrated circuit for reading of the data arising from the execution of the algorithm. A battery is provided for powering the second integrated circuit.

14 Claims, 2 Drawing Sheets

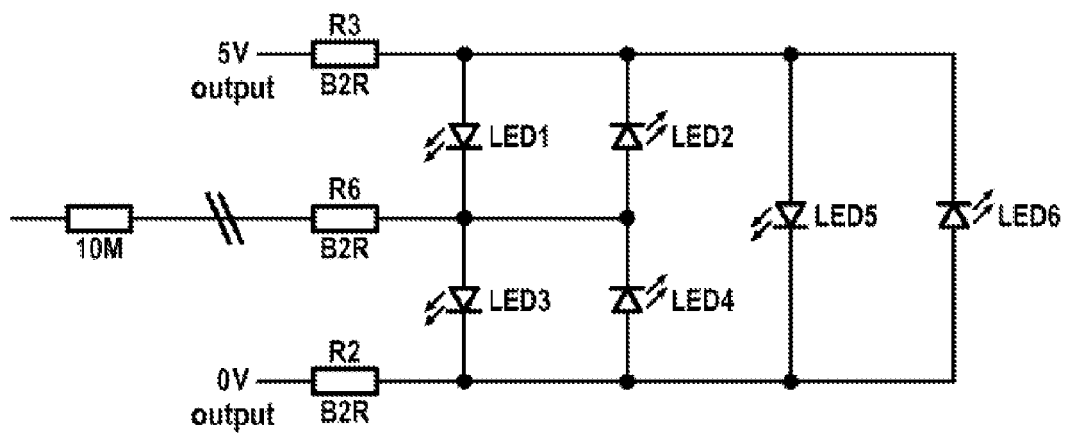

PAYMENT CARD COMPRISING AN ELECTRONIC GAME CHIP

BACKGROUND

The present invention relates to a payment card equipped with a magnetic strip and/or an electronic chip.

A smart card is generally made of plastic material or card according to a standard format such as for example the ISO 7810 bank card format.

Advantageously, but non-limitatively, the invention applies to the field of electronic games on a portable card. In this field, the document US 2008/0096624 is known, describing an electronic game card comprising display means for displaying the win achieved by a user and allowing payment for this win by an authority. Such a card is equipped with an electronic chip, memory and a battery. The drawback of such a system is that the user must take his card to a representative of the authority in order to validate the card. An automated verification system would provide great versatility in use. The technical problem posed in the prior art is therefore the absence of means of electronic communication which would make it possible to automatically transfer the data contained in the memory to a terminal.

A subject of the present invention is therefore a novel system for automatically and securely transferring the data contained in the memory of such a card.

SUMMARY

The abovementioned purpose is achieved with a payment card constituted by a support in the format of a conventional bank payment card, and comprising a first integrated circuit dedicated to banking operations. The card according to the invention also comprises:
- a second integrated circuit not dedicated to banking operations,
- at least one human-machine interface, the second integrated circuit being configured so as to activate at least one part of the human-machine interface in response to an instruction from the user and according to an algorithm contained in the second integrated circuit,
- a memory space connected to the second integrated circuit for saving data originating from the execution of said algorithm; this memory space being also connected to the first integrated circuit for reading by this first integrated circuit of said data originating from the execution of the algorithm,
- a battery for powering the second integrated circuit.

By integrated circuit dedicated to banking operations, is meant an integrated circuit designed and configured so as to communicate with or without contact with change dispensers, smart card readers, payment terminals or other suitable terminals. Such an integrated circuit is also used for recording loyalty points vis-à-vis different organizations.

The algorithm according to the invention can be any type of interactive human-machine algorithm making it possible to store data within the memory space. By way of non-limitative example, this algorithm can be an electronic game such as lotteries, lotto games, adaptation of scratch card games, video-poker, poker in all its forms including simplified forms, roulette, black jack, wheel of fortune, slot machines etc. It will be easily understood that the present invention is not limited to a game but relates to an electronic card which solves at least one technical problem, that of carrying out a transmission of data contained in an interactive electronic card to a secure payment terminal.

The present invention is in particular remarkable, but not uniquely, in that an interactive human-machine chip and a banking operations chip are integrated in the same card, the two chips having access to the same memory space. The banking operations chip can therefore be used to validate the result of human-machine interactivity.

With the card according to the invention, the data originating from the execution of the algorithm can be transmitted by the first integrated circuit to a payment terminal whilst benefitting from all the security protocol established for this type of transaction.

When the algorithm relates to an electronic game, the data originating from the execution of the algorithm can be a win stored in the memory space which can be accessed by the first integrated circuit. In order to claim this win, the user can introduce the card into a cash dispenser so that the latter can identify the user by the conventional means (PIN code) of the first integrated circuit, then return to the latter an amount corresponding to the win. In the field of smart cards used as bank cards, the memory space can act as an electronic wallet. The win can be obtained in the form of money via a cash dispenser or in the form of bank credit via a payment terminal with a merchant in particular.

Otherwise, this win can represent loyalty points which will be transmitted to a remote server after authentication of the user by inserting the first integrated circuit into a smart card reader connected to a computer.

The card according to the invention is stand-alone because of its battery and can be parameterized for several cycles of execution of the algorithm. The algorithm can be executed in an unlimited manner for a given period, and the battery is preferably ultra thin and flexible. Advantageously the battery is also rechargeable. The bank card format, according to the standards ISO 7810 ISO 7811, ISO 7816, ISO 14443 or others, is a format which obviously offers real portability.

According to an advantageous characteristic of the invention, the memory space is incorporated in the first integrated circuit. A memory space present in the first circuit is thus used to store the data originating from the execution of the algorithm. As a variant, the memory space can be incorporated in the second integrated circuit. Another preferred variant is that the first and second integrated circuits are disconnected from one another, there is no direct connection between the two circuits, and the memory space is arranged between these first and second integrated circuits. Thus the only connection between the two integrated circuits is the memory space. The first integrated circuit is thus protected from any hacking attempt via the second integrated circuit.

According to an embodiment of the invention, the first integrated circuit is configured so as to access the memory space in read-only mode. It is also possible to configure the second integrated circuit so that it accesses the memory space in write-only mode.

According to an advantageous variant of the invention, the payment card can be produced so that:
- the first integrated circuit is configured in order to supply a variable in the memory space; and
- the second integrated circuit is configured in order to execute the algorithm as a function of the value of this variable.

With such an arrangement, the variable can be supplied in time, as a number of tokens or in cash for example. Each implementation of the algorithm is equivalent to one consumption of the variable. When the value of the variable is insufficient, the algorithm is no longer implemented. It is possible to supply or credit the variable again from the first integrated circuit. In other words, it is possible to reload the credit for the implementation of the algorithm from a bank card terminal, the memory space being used as an electronic wallet.

Advantageously, the second integrated circuit is configured so as to generate validation data based on the data originating from the execution of the algorithm and a dynamic identifier of the card. This dynamic identifier can be a fixed number associated with a random number. This embodiment constitutes another means for validating a win. The validation data can be transmitted to a terminal or displayed on a display screen of the card.

According to an advantageous characteristic of the invention, the second integrated circuit is connected to a radiofrequency antenna for communication with a remote terminal. It is thus possible to transmit the validation data or allow communication with a remote terminal for downloading files for example.

According to the invention, the human-machine interface can comprise touch, visual and/or sound means allowing interactivity with the user. There may in particular be mentioned:
- a plurality of keys intended for introducing information or allowing activation,
- a piezoelectric membrane or buzzer allowing the retrieval of a voice message, music or acoustic signature,
- one or more bistable and/or flexible display screens (for example electronic paper) as display element for displaying the information allowing the retrieval of an alpha, numeric, alpha numeric message, symbol or pictogram,
- light-emitting diodes (LEDS) making it possible to indicate a positioning, a force, a state.

According to the invention, the second circuit can be connected to a biometric sensor in order to authorize or not authorize the activation of said algorithm. This biometric sensor makes it possible to identify the user on the basis of predefined data.

In addition in particular to the above, it is possible to envisage the presence of a magnetic strip on the payment card. The second integrated circuit, connected to this magnetic strip, can be configured so as to "write", i.e. inscribe information in a part of this magnetic strip, this information being able to then be read by a magnetic strip reader. This information can advantageously comprise the data originating from the execution of the algorithm. The second integrated circuit can also be configured so as to read information which would be present on the magnetic strip so as to activate or not activate the algorithm as a function of this information. It is possible to envisage the memory space comprising all or part of the magnetic strip.

Of course, the different characteristics, forms and embodiment variants of the invention can be associated with each other according to various combinations to the extent that they are not incompatible or mutually exclusive.

BRIEF DESCRIPTION OF DRAWINGS

Other advantages and characteristics of the invention will become apparent on examination of the detailed description of an embodiment which is in no way limitative, and the attached drawings in which:

FIG. 3 is an electronic diagram illustrating light-emitting diodes in a multiplexed control configuration, and FIG. 4 is a table illustrating the control utilized in order to light up the light-emitting diodes of FIG. 3.

Although the invention is not limited thereto, a description will now be given of a payment card according to the invention incorporating an electronic game of the roulette game type.

DETAILED DESCRIPTION

Figure 1:
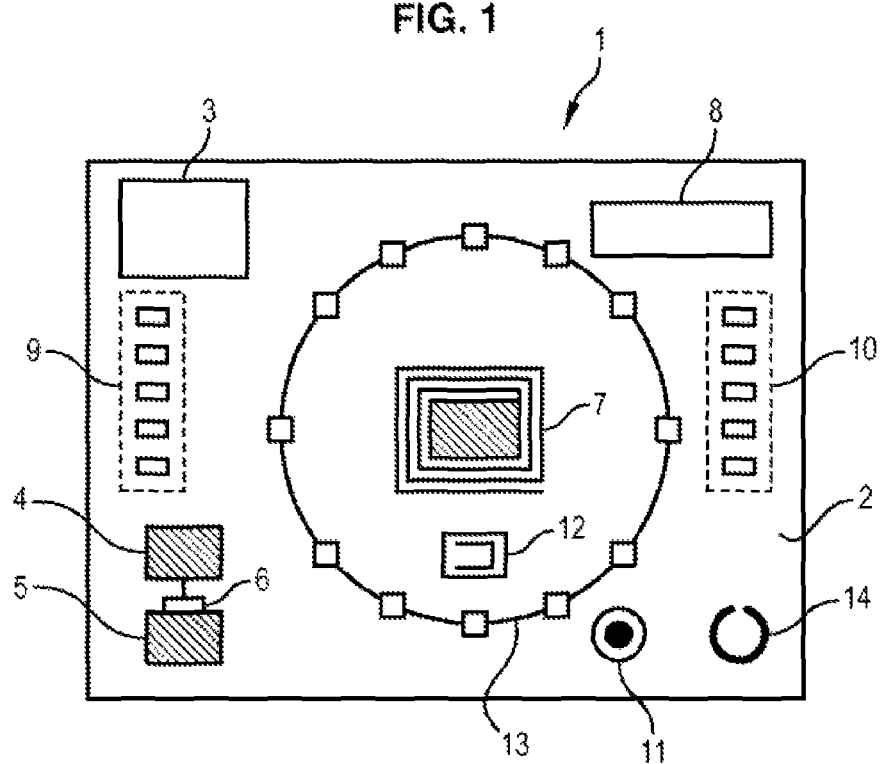
FIG. 1 is a simplified diagrammatic view of internal components of an embodiment example of a card according to the invention.

FIG. 1 shows a card 1 according to the invention comprising a flexible plastic support 2 in the ISO 7810 format in which several electronic components are encapsulated, including a battery 3 which is also flexible. The battery delivers a current of 25 mA/h.

The first integrated circuit 4 is an electronic chip dedicated to banking operations.

The second integrated circuit 5 is a microcontroller such as for example the MSP430F2132 model from Texas Instruments® which is designed for low power consumption and low-cost embedded applications, especially those using a battery. This microcontroller 5 comprises a memory space represented diagrammatically as 6 which can also be accessed by the first integrated circuit 4. In the present example, the algorithm according to the invention is a program for a roulette game saved and implemented within the microcontroller 5.

An RFID chip 7 and its antenna are also shown, allowing a direct connection to the microcontroller 5, which makes it possible to write the number of moves played by the user and the win in the memory 6 of the chip. These elements are then retrieved via a reader via the RFID antenna 7 or via the first integrated circuit 4. The win can advantageously be displayed on a display screen 8. The RFID chip 7 can be a chip of the EM4134 type comprising 512 bits of memory and clocked at a frequency of 13.56 MHz.

A strip 9 is shown comprising seven LEDs (light-emitting diodes) to indicate the number of moves played by the user. The strip 10 comprises 5 LEDs and makes it possible to indicate the win achieved by the user.

The operation of the card can be described as follows. The microcontroller 5 contains the program which controls the entire card. This program can be coded in C.

When the user presses the on/off button 11, the battery 3 supplies the card with current. The microcontroller 5 lights up the LEDs one after the other in random manner and waits for the user to press on the tab 12 in order to start the game, i.e. the implementation of the algorithm. If, after twenty seconds, there has been no action on the part of the user, the card switches off to save the battery.

Figure 2:
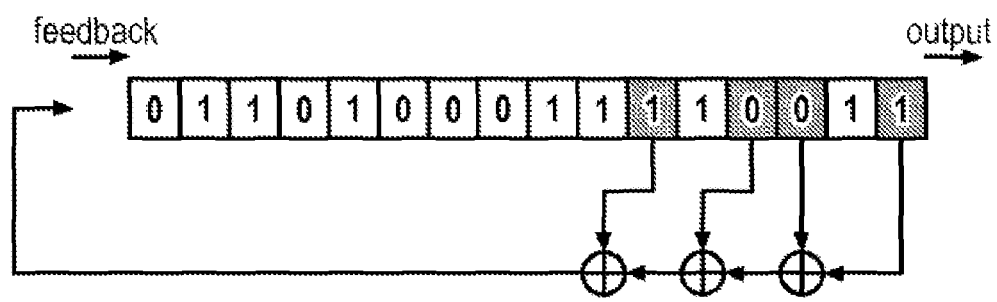
FIG. 2 is a simplified diagram illustrating an LFSR-type register.

When the user taps on the tab before the card switches off, the wheel 13 which comprises several LEDs begins to "turn", i.e. the LEDs on the wheel 13 light up successively so as to simulate the rotation of a wheel. Then, the wheel 13 gradually stops "turning" until it stops at one of the LEDs at random. This random stopping algorithm is generated by a pseudorandom number generator. It is possible to use an LFSR or "linear feedback shift register". This is a shift register as shown in FIG. 2 with linear feedback where one or more output bits undergo operations/transformations such as an exclusive "or" for example before being reinserted into the register. This register can be implemented in C and incorporated in the program of the microcontroller 5.

This algorithm makes it possible to randomly define the LED which will light up when the wheel stops turning. In the example described, a total of 24 LEDs are arranged on the card. When for example a microcontroller is used having only 24 inputs/outputs (I/O) and these are not all used for the LEDs, multiplexing is advantageously carried out. In order to do this, the method known as "charlieplexing" is used. This method allows n(n−1) LEDs to be controlled by means of n I/Os. An example is given for three I/Os in FIG. 3 with six LEDs which light up according to the values defined in the table in FIG. 4.

When the wheel 13 stops, a first LED in the strip 9 lights up, signifying that the payer has played his first move. An LED corresponding to the win obtained on the wheel lights up on the strip 10 showing the wins. At the second move, a second LED lights up on the strip 9 showing the moves and the corresponding win lights up on that of the wins, and so on.

It is possible to save in the memory space 6 a numeric value representing the win obtained or to save a validation value in alphanumeric format which is a combination of the value of the win with a dynamic identifier of the card. This combination is produced by the microcontroller.

In order to claim his win, the user can for example:
- go to a merchant having a dedicated terminal for reading the content of the memory 6 either via the RFID antenna, via the first integrated circuit 4 when this terminal is a payment terminal, or via a piezoelectric membrane 14 emitting a sound sequence for the telephone network;
- use a cash dispenser by inserting the first integrated circuit 4 which is also a chip for a bank card, and by entering the PIN code associated with his bank card;
- send the validation data via the Internet to a dedicated server for collecting validation data, which can be done via a smart card reader connected to a computer, by entering the validation data, or by the piezoelectric membrane 14.

Of course, the invention is not limited to the examples which have just been described, and numerous adjustments can be made to these examples without exceeding the scope of the invention.

The invention claimed is:

1. A payment card, comprising: a support in the format of a conventional bank payment card, and comprising a first integrated circuit dedicated to banking operations;
   a microcontroller not dedicated to banking operations;
   at least one human-machine interface, the microcontroller being configured so as to activate at least one part of the human-machine interface in response to an instruction from the user and according to an algorithm contained in the microcontroller;
   a memory space connected to the microcontroller for saving data originating from the execution of said algorithm; this memory space being also connected to the first integrated circuit for reading said data originating from the execution of the algorithm; and
   a battery for powering the microcontroller.

2. The card according to claim 1, characterized in that the memory space is incorporated in the first integrated circuit.

3. The card according to claim 1, characterized in that the memory space is incorporated in the microcontroller.

4. The card according to claim 1, characterized in that the first integrated circuit and the microcontroller are disconnected from one other, and the memory space is arranged between the first integrated circuit and the microcontroller.

5. The card according to claim 1, characterized in that the first integrated circuit is configured in order to access the memory space in read-only mode.

6. The card according to claim 1, characterized in that the microcontroller is configured in order to access the memory space in write-only mode.

7. The card according to claim 1, characterized in that:
   the first integrated circuit is configured so as to supply a variable in the memory space; and
   the microcontroller is configured so as to execute the algorithm as a function of the value of this variable.

8. The card according to claim 1, characterized in that the microcontroller is configured so as to generate validation data based on the data originating from the execution of the algorithm and a dynamic identifier of the card.

9. The card according to claim 8, characterized in that the dynamic identifier is a fixed number associated with a random number.

10. The card according to claim 1, characterized in that the microcontroller is connected to a radiofrequency antenna for communication with a remote terminal.

11. The card according to claim 1, characterized in that the human-machine interface comprises tactile, visual and/or sound means allowing interactivity with the user.

12. The card according to claim 1, characterized in that the battery is of rechargeable type.

13. The card according to claim 1, characterized in that the second circuit is connected to a biometric sensor in order to authorize or not authorize the activation of said algorithm.

14. The card according to claim 1, characterized in that it comprises a magnetic strip connected at least to the microcontroller.

* * * * *